United States Patent
Kim et al.

(10) Patent No.: US 7,606,338 B2
(45) Date of Patent: Oct. 20, 2009

(54) ANALOG CORRELATOR FOR VERY HIGH SPEED DATA COMMUNICATION

(75) Inventors: Young-hwan Kim, Hwaseong-si (KR); Hak-sun Kim, Daejeon (KR); Chang-seok Lee, Daejeon (KR); Kwy-ro Lee, Daejeon (KR); Seong-soo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 11/357,998

(22) Filed: Feb. 22, 2006

(65) Prior Publication Data

US 2006/0188028 A1    Aug. 24, 2006

(30) Foreign Application Priority Data

Feb. 22, 2005    (KR) ...................... 10-2005-0014539

(51) Int. Cl.
  *H03D 1/00*    (2006.01)
  *H03H 7/18*    (2006.01)
(52) U.S. Cl. ...................................... 375/343; 333/140
(58) Field of Classification Search ................ 375/343, 375/350, 376, 229, 257; 333/140, 161, 162; 327/278
See application file for complete search history.

(56) References Cited

U.S. PATENT DOCUMENTS

| | | | | |
|---|---|---|---|---|
| 4,441,192 | A  * | 4/1984 | Kita et al. | 375/232 |
| 6,762,654 | B1 * | 7/2004 | Tanaka | 333/140 |
| 6,788,736 | B1 * | 9/2004 | Kawama et al. | 375/152 |
| 7,050,775 | B2 * | 5/2006 | Mayor et al. | 455/258 |
| 2004/0008063 | A1 * | 1/2004 | Kim et al. | 327/158 |
| 2005/0168260 | A1 * | 8/2005 | Tomerlin et al. | 327/278 |

* cited by examiner

*Primary Examiner*—Khai Tran
(74) *Attorney, Agent, or Firm*—Sughrue Mion, PLLC

(57) ABSTRACT

An analog correlator for very high speed data communication, including a single transmission line receiving an input signal and used as a signal delay circuit, a plurality of analog multipliers connected in parallel with a predetermined gap from the transmission line, for receiving a predetermined size of voltages, respectively, and an adder for adding the signals from the plurality of analog multipliers and transmitting the resultant signal as an output signal. The analog correlator can perform very high speed data communication, and can be applied to a high precision position estimation system. Moreover, the time delay is controlled in each part of the transmission line by adjusting a size of a variable capacitor. As a result, the length of the transmission line can be adjusted. Furthermore, the correlator is adaptively used according to variations of the very high speed communication environment by adjusting voltages of application voltage devices.

8 Claims, 8 Drawing Sheets

ANALOG CORRELATOR FOR VERY HIGH SPEED DATA COMMUNICATION

CROSS-REFERENCE TO RELATED APPLICATIONS

This application claims priority from Korean Patent Application No. 10-2005-0014539, filed on Feb. 22, 2005, the entire content of which is incorporated herein by reference.

BACKGROUND OF THE INVENTION

1. Field of the Invention

Apparatuses consistent with the present invention relate to an analog correlator for very high speed data communication, and more particularly, to an analog correlator for very high speed data communication using a transmission line and a lumped element.

2. Description of the Related Art

In general, the mobile communication field has recently drawn attention, and the digital mobile communication has especially been rapidly developed by using base technology such as CDMA. A correlator is essentially used for synchronization demodulation in a communication apparatus using the CDMA. The correlator mostly uses digital methods.

The current digital communication has improved for high speed transmission. The conventional digital correlator cannot be embodied at a high transmission speed. That is, the conventional correlator using the digital technology cannot technically accept the digital communication increasing its speed. Since a chip period that is a clock composing the CDMA has a much higher speed than the transmitted information by a few orders of magnitude, it is difficult to embody a demodulator as the digital correlator.

FIG. 2 is a view illustrating a conventional impulse correlator using an RF mixer. The impulse correlator includes an RF mixer 200, a template generator 140, an integrator 150 and an A/D converter 160. The operational principle of the conventional impulse correlator using the RF mixer will now be explained with reference to FIG. 2. When receiving an input signal 210, the template generator 140 generates a template signal 220 in the same type as the input signal 210, matches synchronization of the input signal 210 and the template signal 220, multiplies the signals 210 and 220 by the RF mixer 200, integrates the signals 210 and 220 by the integrator 150, and samples the signals 210 and 220 through the A/D converter 160.

However, in the above method, it is difficult to embody a broadband mixer and the template generator 140 for matching synchronization with the input signal 210 according to variations of the channel environment. Also, power consumption increases.

FIG. 3 is a view illustrating a conventional correlator using a digital delay circuit. The conventional correlator using the digital delay circuit receives an A/D converted signal 300, and processes the signal 300 in a digital domain. Therefore, the conventional correlator can be applied to various types of signals. However, although a high speed A/D converter 160 is necessary for short pulses, it is impossible to process signals in the very high speed data communication environment by using the A/D converter 160.

SUMMARY OF THE INVENTION

Accordingly, an aspect of the present invention is to provide an analog correlator for very high speed data communication.

In order to achieve the above and other aspects of the invention, there is provided an analog correlator for very high speed data communication, including: a single transmission line receiving an input signal and being used as a signal delay circuit; a plurality of analog multipliers connected in parallel with a predetermined gap from the transmission line, for receiving a predetermined size of voltages, respectively; and an adder for adding the signals from the plurality of analog multipliers and transmitting the resultant signal as an output signal. Preferably, the transmission line is embodied as a lumped element. In addition, the lumped element includes a capacitor and an inductor.

The capacitor is a variable capacitor which can adjust signal delay. The inductor is a coil that can be used as a variable resistance. Voltage application devices are connected to the plurality of analog multipliers, respectively. The voltage application devices can vary the set voltage.

BRIEF DESCRIPTION OF THE DRAWINGS

The above aspects and features of the present invention will be made more apparent by describing exemplary embodiments of the present invention with reference to the accompanying drawings, in which.

DETAILED DESCRIPTION OF THE EXEMPLARY EMBODIMENTS

An analog correlator for very high speed data communication in accordance with exemplary embodiments of the present invention will now be described in detail with reference to the accompanying drawings.

Figure 1:
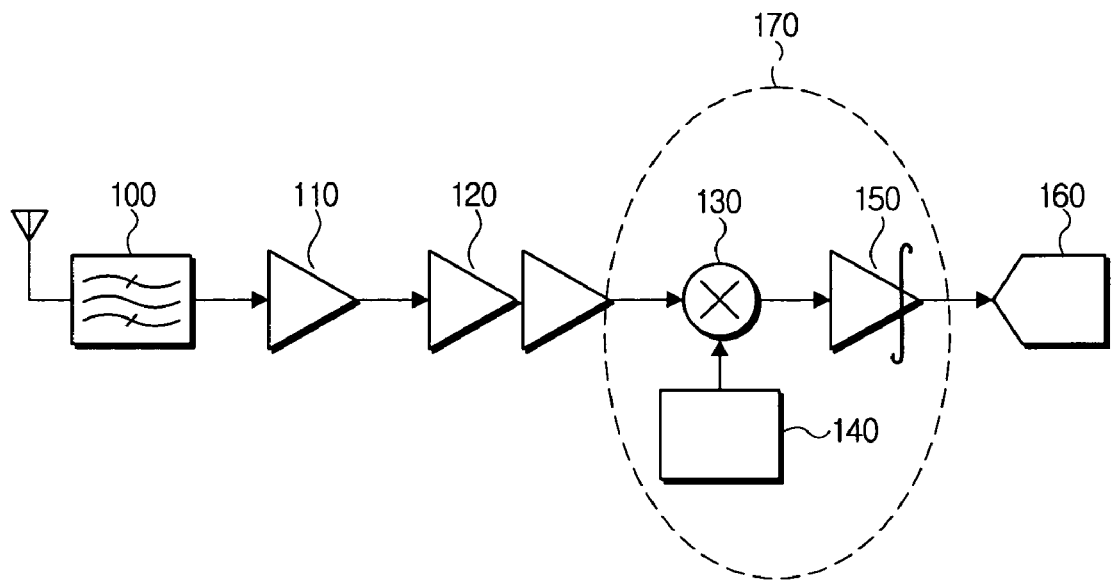
FIG. 1 is a structure view illustrating a communication system using an analog correlator for very high speed data communication in accordance with an exemplary embodiment of the present invention.
Figure 2:
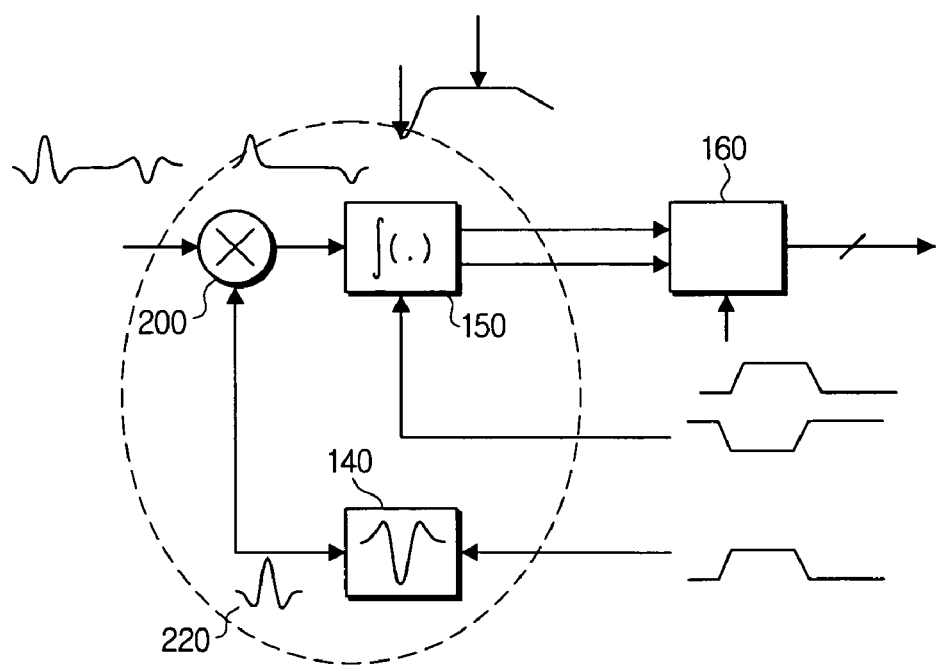
FIG. 2 is a view illustrating a conventional impulse correlator using an RF mixer.
Figure 3:
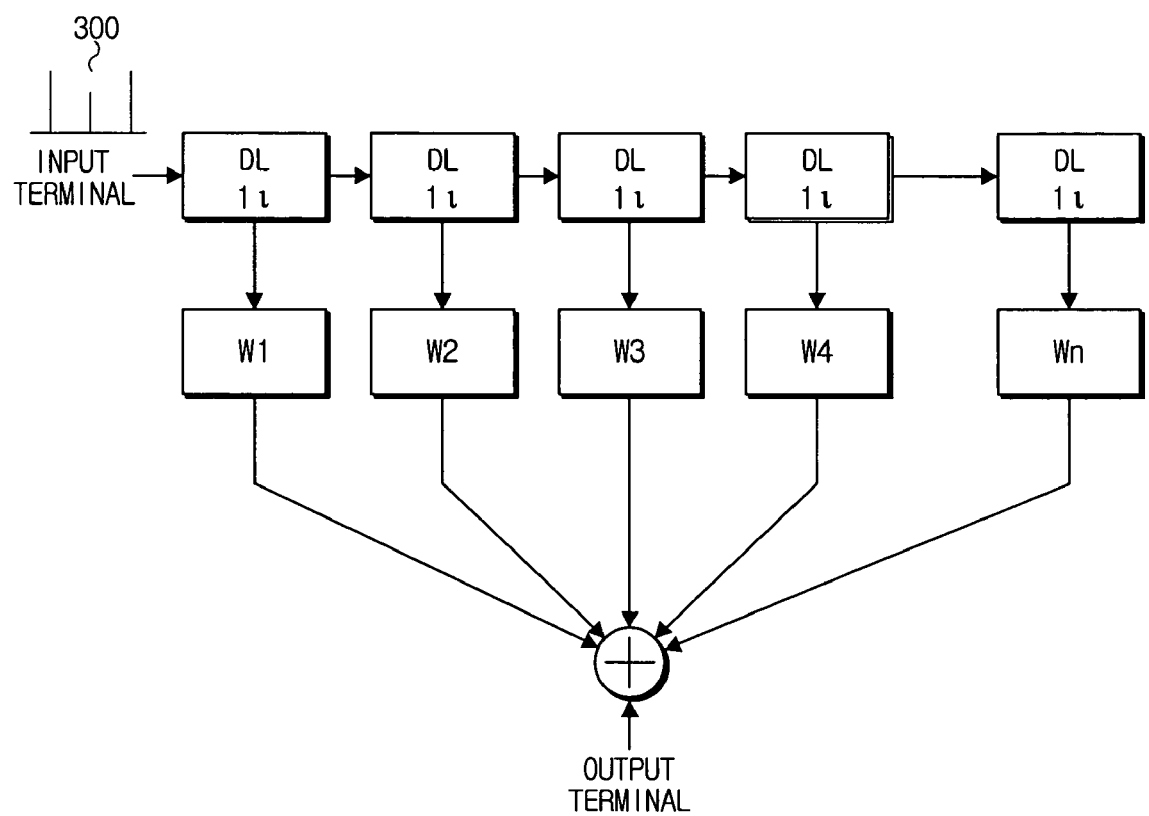
FIG. 3 is a view illustrating a conventional correlator using a digital delay circuit.

FIG. 1 is a structure view illustrating a communication system using an analog correlator for very high speed data communication in accordance with an exemplary embodiment of the present invention.

Referring to FIG. 1, the communication system includes a filter 100, a low noise amplifier 110, a variable amplifier 120, a multiplier 130, a template generator 140, an integrator 150 and an A/D converter 160. Here, aspects of the present invention relate to the correlator (170) including the multiplier 130, the template generator 140 and the integrator 150.

Figure 4:
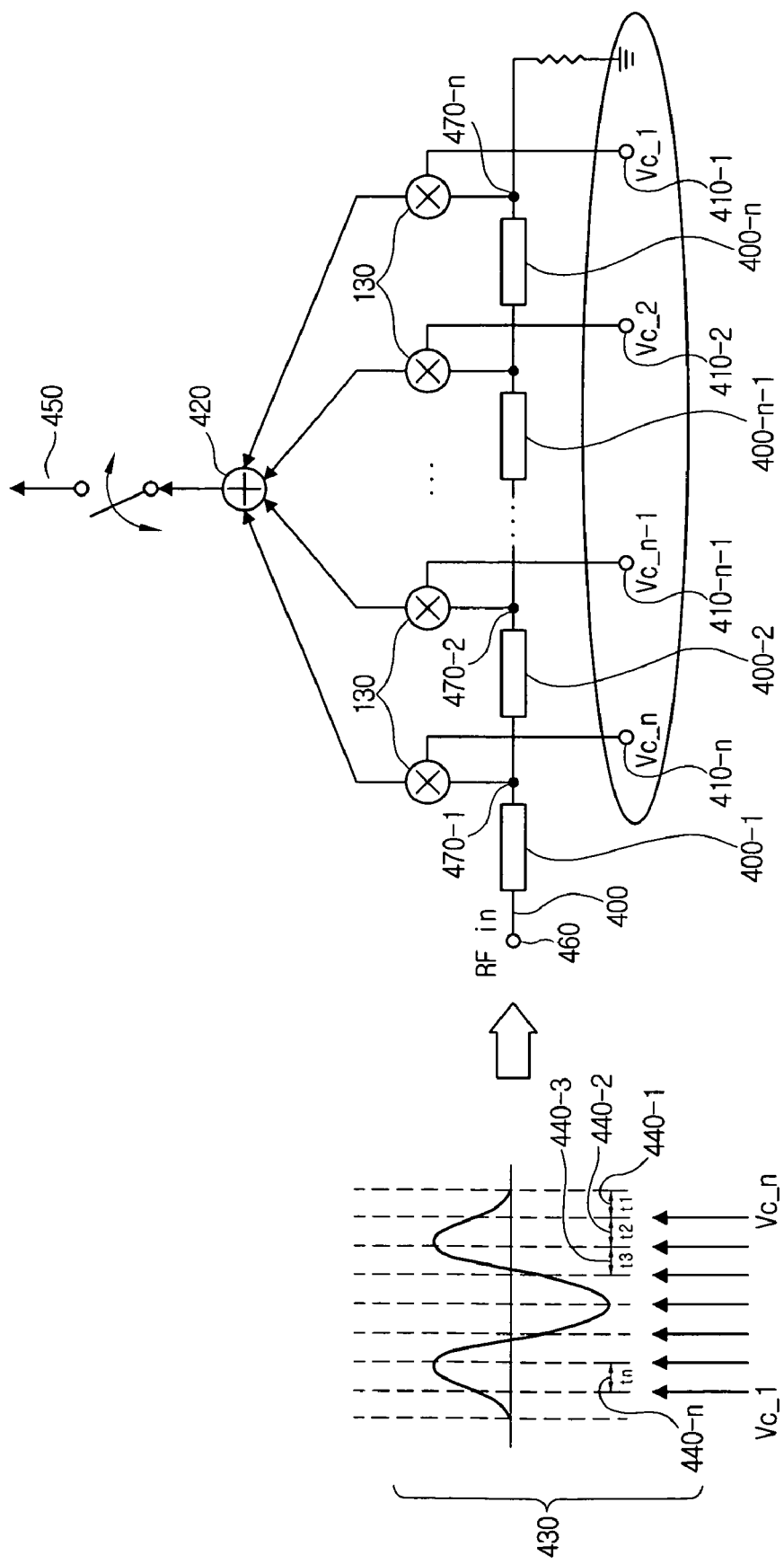
FIG. 4 is a view illustrating the structure and operational principle of the analog correlator for very high speed data communication in accordance with an exemplary embodiment of the present invention.

FIG. 4 is a view illustrating the structure and operational principle of the analog correlator for very high speed data communication in accordance with an exemplary embodiment of the present invention. As illustrated in FIG. 4, the analog correlator for very high speed data communication includes multipliers 130, a transmission line 400, voltage application devices 410-1, 410-2, ..., 410-n-1, 410-n, and an adder 420. The analog correlator for very high speed data communication receives a predetermined signal 430 according to the communication environment. The structure and operational principle of the analog correlator for very high speed data communication in accordance with the present invention will now be explained with reference to FIG. 4. The signal 430 is applied to the single transmission line 400 used as a signal delay circuit. The plurality of multipliers 130 are connected in parallel to the transmission line 400.

The voltage application devices 410-1, 410-2, 410-3, ..., 410-n are connected respectively to the plurality of multipliers 130. Application voltages VC_1, VC_2, VC_3, VC_n are set in the voltage application devices 410-1, 410-2, 410-3, ..., 410-n, respectively. Such application voltages can be appropriately adjusted according to the communication environment. When an input signal 430 is applied through an input terminal 460, the first part 400-1 of the transmission line 400 has time delay (t1) 440-1, and the voltage VC_n is applied from the voltage application device 410-n to the multiplier 130 connected in parallel to the first part 400-1 of the transmission line 400.

In addition, the second part 400-2 of the transmission line 400 has time delay (t2) 440-2, and the voltage VC_n-1 is applied from the voltage application device 410-n-1 to the multiplier 130 connected in parallel to the second part 400-2 of the transmission line 400. The above operations are sequentially performed when the input signal 430 proceeds through the transmission line 400. At last, the n part 400-n of the transmission line 400 has time delay (tn) 440-n, and the voltage VC_1 is applied from the voltage application device 410-1 to the multiplier 130 connected in parallel to the n part 400-n of the transmission line 400. As a result, the signals from the plurality of multipliers 130 are added by the adder 420, to compose a correlator output signal 450.

Figure 5:
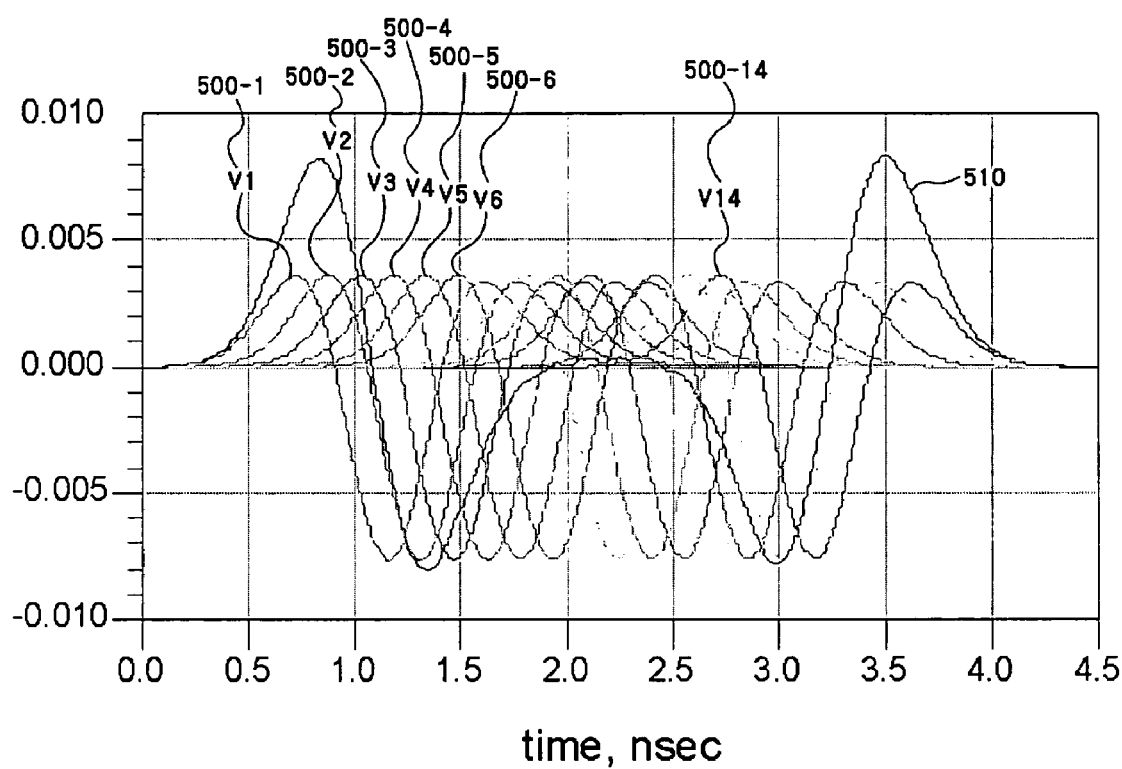
FIG. 5 is a view illustrating simulation results of the analog correlator for very high speed data communication in accordance with an exemplary embodiment of the present invention.

FIG. 5 is a view illustrating simulation results of the analog correlator for very high speed data communication in accordance with an exemplary embodiment of the present invention. The simulation results are obtained by measuring the signals by time in each node 470-1, 470-2, 470-3, ..., 470-14 of the transmission line 400 of FIG. 4. V1(500-1), V2(500-2), V3(500-3), ..., V14(500-14) denote voltages in each position. Since the transmission line 400 used in the simulation has homogeneous properties, the same signal delay effects are generated in each part 400-1, 400-2, 400-3, ..., 400-14 of the transmission line 400. Accordingly, as shown in FIG. 5, signal waveforms in each position are delayed at regular time intervals. On the other hand, VSUM 510 denotes the sum of the signals.

Figure 6:
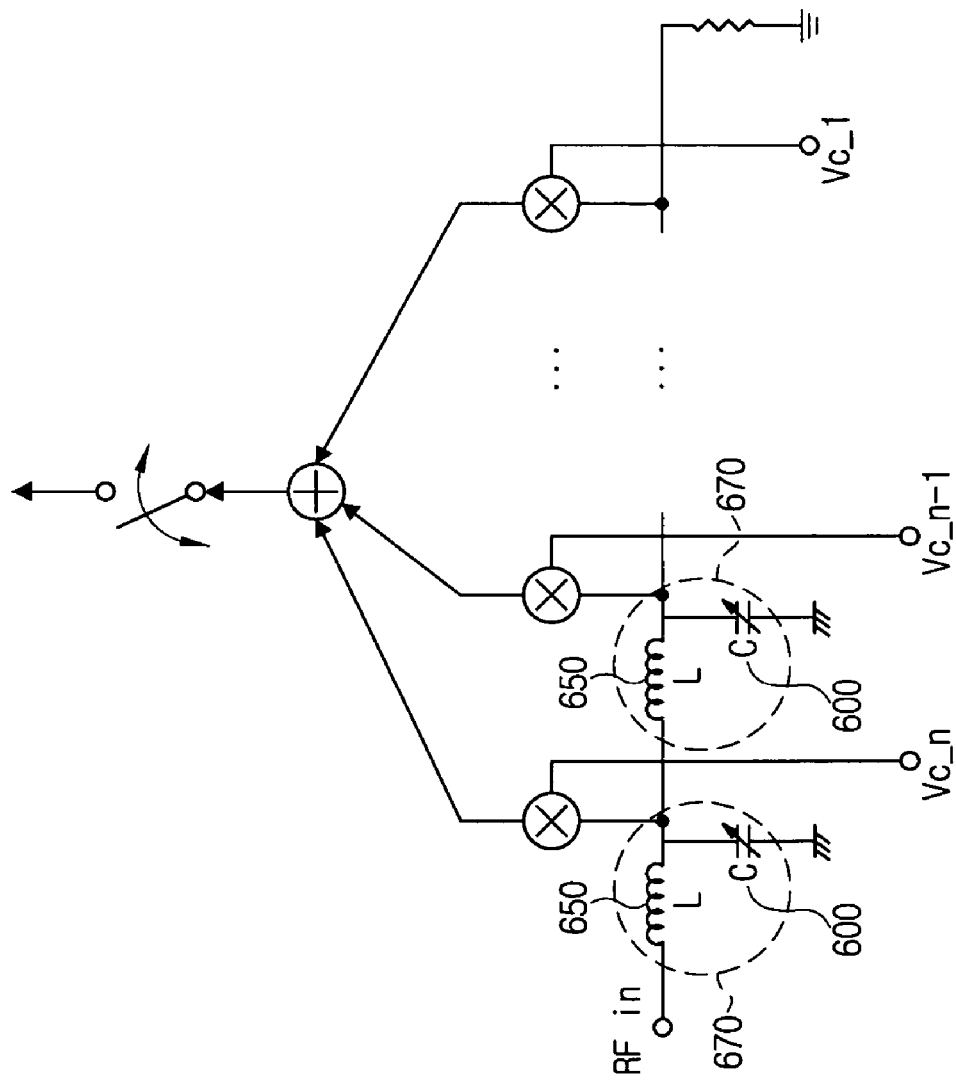
FIG. 6 is a view illustrating another example of the analog correlator for very high speed data communication in accordance with an exemplary embodiment of the present invention.

FIG. 6 is a view illustrating another example of the analog correlator for very high speed data communication in accordance with an exemplary embodiment of the present invention. As depicted in FIG. 6, the parts 400-1, 400-2, 400-3, ..., 400-14 of the transmission line 400 of FIG. 4 are embodied as lumped element circuits 670 including a variable capacitor 600 and an inductor 650. Here, the delay time of each part 400-1, 400-2, 400-3, ..., 400-14 of the transmission line 400 can be controlled by adjusting the size of the variable capacitor 600.

Figure 7A:
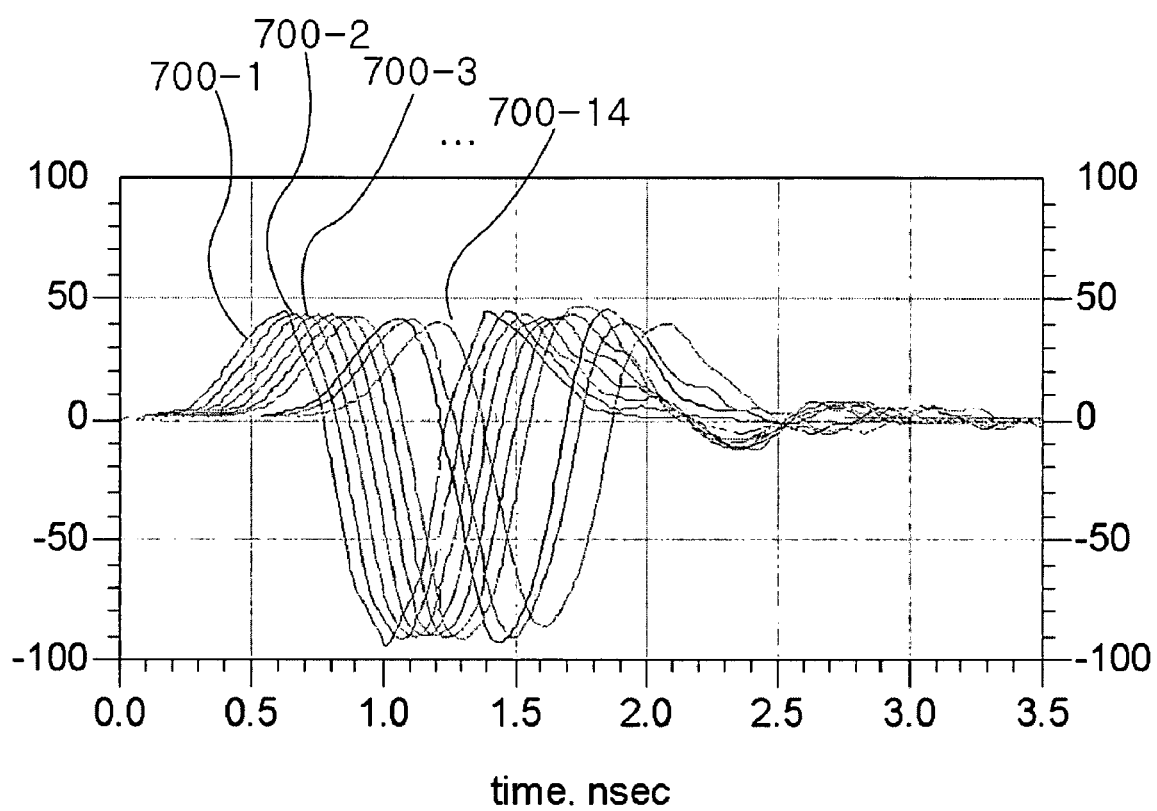
FIGS. 7A to 7C are views illustrating signal delay effects in each part of a transmission line by variations of a variable capacitor.
Figure 7B:
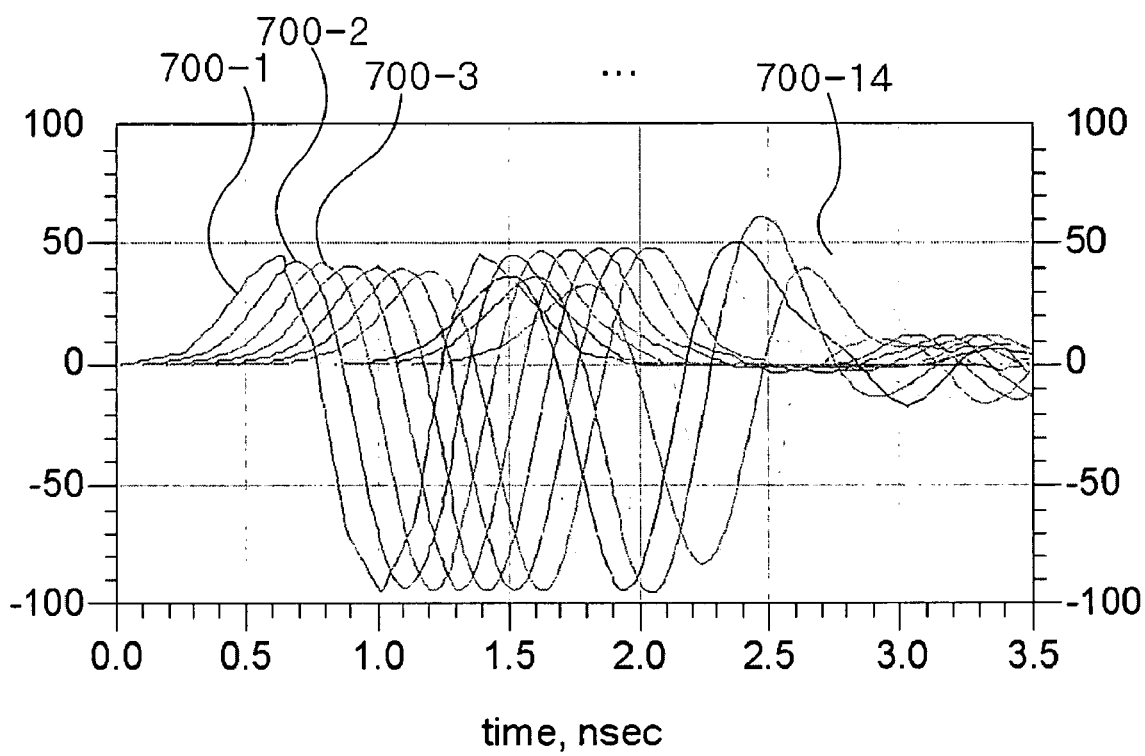
Figure 7C:
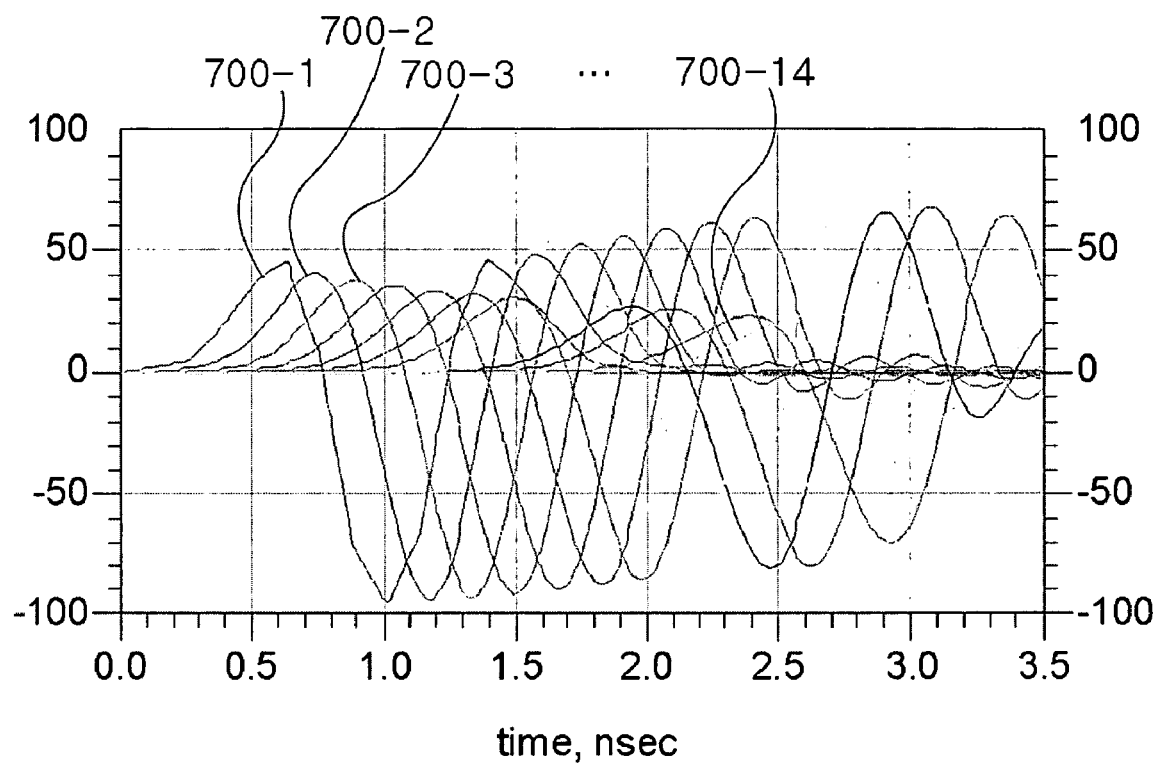

FIGS. 7A to 7C are views illustrating signal delay effects in each part of the transmission line by variations of the variable capacitor. The graphs show signal proceeding properties by time. The property impedance value of the lumped element circuits 670 replacing each part 400-1, 400-2, 400-3, ..., 400-14 of the transmission line 400 is represented by the following Formula 1:

$$X = \sqrt{\frac{L}{C}}$$  Formula 1

Here, L represents an inductance value and C represents a capacitance value. X that is a property impedance value is set as 50 ohm in the experiment for obtaining the graphs of FIGS. 7A to 7C.

$$C=1*a[pF], L=2.5*a[mH]$$  Formula 2

That is, a capacitance C is obtained by multiplying '1' by 'a' and an inductance L is obtained by multiplying '2.5' by 'a'. Here, 'a' is a proportional constant for adjusting C and L at a certain ratio. The capacitance C uses a unit of [pF] and the inductance L uses a unit of [mH].

FIG. 7A shows signal proceeding properties 700-1, 700-1, 700-1, 700-2, 700-3, ..., 700-14 by time in each node 470-1, 470-2, 470-3, ..., 470-14 of FIG. 4, when the proportional constant 'a' is '1'. On the other hand, FIG. 7B shows signal proceeding properties by time in each node 470-1, 470-2, 470-3, ..., 470-14 of FIG. 4, when the proportional constant 'a' is '2'. In addition, FIG. 7C shows signal proceeding properties by time in each node 470-1, 470-2, 470-3, ..., 470-14 of FIG. 4, when the proportional constant 'a' is '3'.

The graphs of FIGS. 7A to 7C will now be compared with each other. Each node 470-1, 470-2, 470-3, ..., 470-14 has a time delay of 0.07 nsec in FIG. 7A, a time delay of 0.1 nsec in FIG. 7B and a time delay of 0.17 nsec in FIG. 7C. Accordingly, the time delay can be individually controlled in each node 470-1, 470-2, 470-3, ..., 470-14 of the transmission line 400 by adjusting the size of the variable capacitor 600.

As discussed earlier, in accordance with exemplary embodiments of the present invention, the analog correlator for very high speed data communication can be obtained. In addition, the time delay can be individually controlled in each part of the transmission line by adjusting the size of the variable capacitor. As a result, the length of the transmission line can be adjusted. The correlator can be adaptively used according to variations of the very high speed communication environment by adjusting the voltages of the application voltage devices.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An analog correlator for very high speed data communication, comprising:
   a single transmission line receiving an input signal;
   a plurality of analog multipliers each connected in parallel with a respective predetermined gap from the transmission line; and
   an adder which adds signals output from the plurality of analog multipliers and transmits a resultant signal as an output signal,
   wherein the transmission line is used as a signal delay circuit, and the plurality of analog multipliers each receives a respective predetermined size of voltages.

2. The analog correlator for very high speed data communication as claimed in claim 1, wherein the transmission line is embodied as a lumped element.

3. The analog correlator for very high speed data communication as claimed in claim 2, wherein the lumped element comprises a capacitor and an inductor.

4. The analog correlator for very high speed data communication as claimed in claim 3, wherein the capacitor is a variable capacitor for adjusting signal delay.

5. The analog correlator for very high speed data communication as claimed in claim 3, wherein the inductor is a coil used as a variable resistance.

6. The analog correlator for very high speed data communication as claimed in claim 1, wherein voltage application devices are connected to the plurality of analog multipliers, respectively.

7. The analog correlator for very high speed data communication as claimed in claim 6, wherein the voltage application devices vary set voltages as the predetermined size of voltages.

8. An analog correlator, comprising:

a transmission line which receives an input signal, the transmission line comprising a plurality of delay circuits configured in series to delay the input signal;

a plurality of analog multipliers each connected in parallel at respective points on the transmission line, the respective points located between adjacent delay circuits and having different time delay characteristics of the input signal; and an adder which adds signals output form the plurality of analog multipliers and transmits a resultant added signal as an output signal, wherein each of the plurality of analog multipliers receives a respective voltage and multiplies the respective voltage with a respective time-delayed input signal obtained at the respective point to which the analog multiplier is connected.

* * * * *